(12) United States Patent
Watanabe (10) Patent No.: US 10,131,349 B2
(45) Date of Patent: Nov. 20, 2018

(54) STEERING ASSISTANT (71) Applicant: SUBARU CORPORATION, Tokyo (JP)

(72) Inventor: Akihiro Watanabe, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 133 days.

(21) Appl. No.: 15/215,162

(22) Filed: Jul. 20, 2016

(65) Prior Publication Data
US 2017/0043772 A1 Feb. 16, 2017

(30) Foreign Application Priority Data

Aug. 10, 2015 (JP) .................................. 2015-158335

(51) Int. Cl.
A01B 69/00 (2006.01)
B62D 6/00 (2006.01)
B62D 11/00 (2006.01)
B62D 12/00 (2006.01)
B63G 8/20 (2006.01)
B63H 25/04 (2006.01)
G05D 1/00 (2006.01)
G05F 7/00 (2006.01)
G06F 17/00 (2006.01)
G06F 19/00 (2018.01)
B60W 30/12 (2006.01)
B60W 40/06 (2012.01)
G06K 9/00 (2006.01)
(Continued)

(52) U.S. Cl.
CPC ............ *B60W 30/12* (2013.01); *B60W 40/06* (2013.01); *G06K 9/00798* (2013.01); *H04N 13/239* (2018.05); *H04N 13/296* (2018.05)

(58) Field of Classification Search
None
See application file for complete search history.

(56) References Cited

U.S. PATENT DOCUMENTS 9,406,232 B2 * 8/2016 Kataoka ................. G08G 1/167

FOREIGN PATENT DOCUMENTS

| JP | 3912416 B2 | 5/2007 |
| JP | 2014-122965 A | 7/2014 |
| JP | 2015-069341 A | 4/2015 |

OTHER PUBLICATIONS

Notification of Reasons for Refusal issued in corresponding Japanese Patent Application No. 2015-158335, dated Feb. 7, 2017.

* cited by examiner

Primary Examiner — Anne M Antonucci
Assistant Examiner — Kenny A. Taveras
(74) Attorney, Agent, or Firm — McDermott Will & Emery LLP (57) ABSTRACT A steering assistant includes a lane width setting unit and a determination unit. The lane width setting unit provides setting of a lane width between lane lines on right and left sides of an own vehicle. The determination unit monitors a lane line state to determine how the lane line state has transited, in which the lane line state involves presence or absence of the lane lines on the right and left sides of the own vehicle. The lane width setting unit provides the setting of the lane width, with a virtual lane line assumed on side on which the lane line is missing, when it is determined that the lane line state has transited to a state in which the lane line is provided on either one of the right and left sides of the own vehicle.

8 Claims, 5 Drawing Sheets (51) Int. Cl.
*H04N 13/296* (2018.01)
*H04N 13/239* (2018.01)

STEERING ASSISTANT

CROSS-REFERENCE TO RELATED APPLICATIONS

The present application claims priority from Japanese Patent Application No. 2015-158335 filed on Aug. 10, 2015, the entire contents of which are hereby incorporated by reference.

BACKGROUND

The technology relates to a steering assistant that may assist a driver with steering operations.

In recent years, driving assistant systems for vehicles such as automobiles have been developed and put into practical use. Such a driving assistant system may recognize travelling environment around a vehicle by means of an on-board device such as a camera and radar, to assist a driver with driving operations, and to lessen an operation burden on a driver. Some driving assistant systems may have a function of recognizing lane lines of a road on which an own vehicle travels, and performing a steering control and giving an alarm for purpose of lane keeping travelling and lane deviation prevention.

For example, Japanese Patent No. 3,912,416 discloses a technique that involves predicting how long it takes for a vehicle to deviate from a travelling section and giving an alarm, based on information on a lane width of a road on which the vehicle travels. In general, the lane width may be calculated by recognizing lane lines on the road, as disclosed in Japanese Patent No 3,912,416.

SUMMARY

The lane lines are, however, not always provided on both right and left sides of the own vehicle. In some cases, the lane line may be provided on either one side. With the lane line provided on either one side, there may be a case of travelling across the lane line, depending on circumstances. In such a case, executing a steering assistance control based on the lane line on either one side may cause control intervention to be started more frequently at unnecessary timing. In addition, there may be variation in performance of an operation assistance control between the case with the lane line on either one side and a case with the lane lines on both sides. This may possibly cause a driver to feel incongruous or annoyed.

It is desirable to provide a steering assistant that makes it possible to perform a steering assistance control in accordance with a state of lane lines, and to restrain unnecessary control intervention and variation in control performance.

An aspect of the technology provides a steering assistant that determines intervention timing and a control amount of an assistance control that involves assisting a driver with steering operations, based on a lane width of a road on which an own vehicle travels. The steering assistant includes a lane width setting unit and a determination unit. The lane width setting unit provides setting of a lane width between lane lines on right and left sides of the own vehicle. The determination unit monitors a lane line state to determine how the lane line state has transited, in which the lane line state involves presence or absence of the lane lines on the right and left sides of the own vehicle. The lane width setting unit provides the setting of the lane width, with a virtual lane line assumed on side on which the lane line is missing, when it is determined that the lane line state has transited to a state in which the lane line is provided on either one of the right and left sides of the own vehicle.

DETAILED DESCRIPTION

In the following, some implementations of the technology are described with reference to the drawings.

Figure 1:
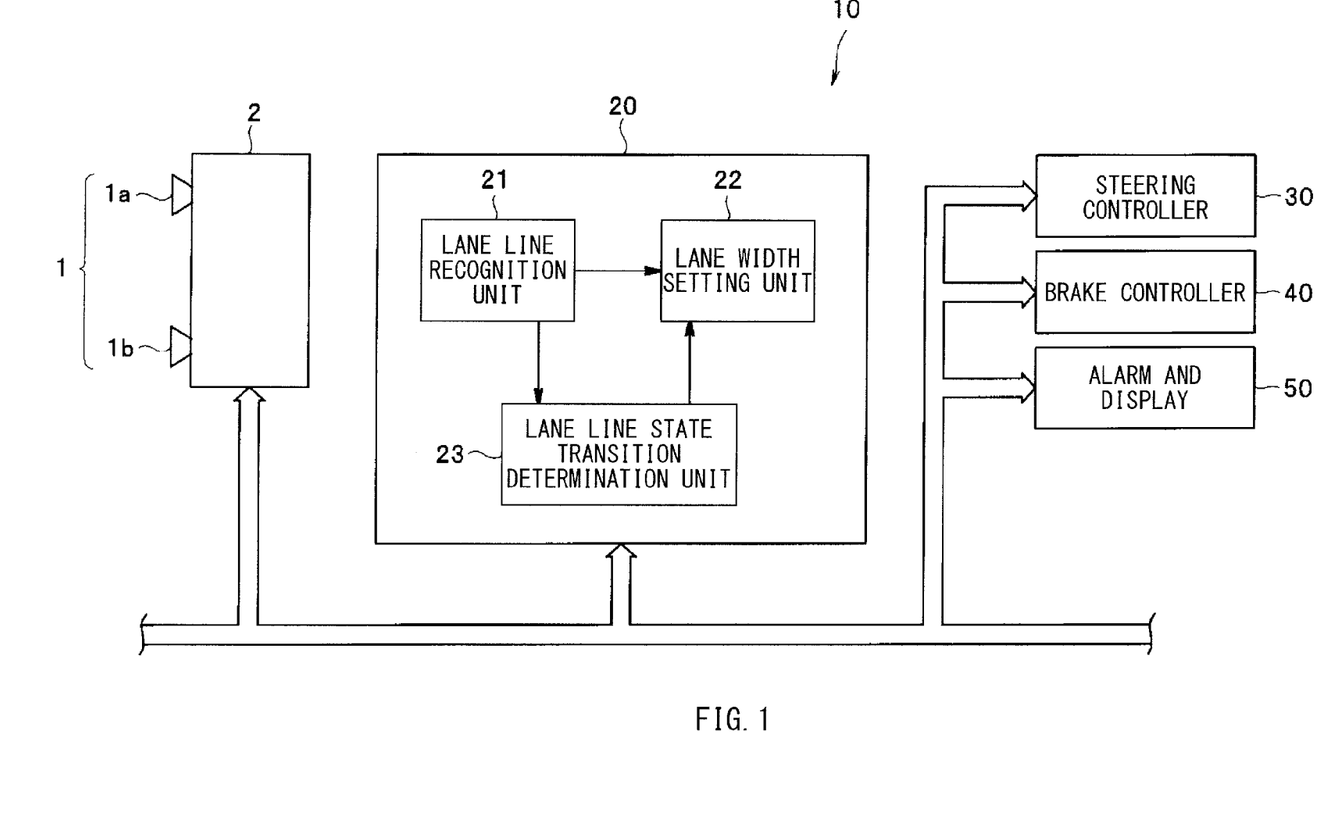
FIG. 1 illustrates an example of a configuration of a steering assistant according to an implementation of the technology.

Referring to FIG. 1, a steering assistant 10 may assist a driver with steering operations in a vehicle such as, but not limited to, an automobile. The steering assistant 10 may include, as its principal components, a lane line recognizer 20, a steering controller 30, and a brake controller 40. The lane line recognizer 20 may recognize lane lines of a road. The steering controller 30 may perform a steering control. The brake controller 40 may control a brake. An alarm and display 50 may be coupled to the steering assistant 10. The alarm and display 50 may provide a driver with display of information of various kinds related to lane line recognition and a steering assistance control, and may give an alarm to the driver.

The lane line recognizer 20 may recognize the lane lines of the road on which an own vehicle travels, based on an image of a road surface captured by a camera, data on reflection obtained from the road surface by means of laser radar, and/or any other method. In one implementation, the lane line recognizer 20 may recognize the lane lines on the road, based on an image captured by an on-board camera 1. The camera 1 may be a stereo camera configured by two cameras 1a and 1b that may capture respective images of a same object from different viewpoints. The cameras 1a and 1b may be synchronized in shutter with each other, and each may have an imaging device such as, but not limited to, CCD (charge coupled device) and CMOS (complementary metal oxide semiconductor). The cameras 1a and 1b may be so disposed at their respective positions as to have a predetermined baseline length. The positions may be near a rear-view mirror on inner side of a windshield, in an upper part of a vehicle interior.

The stereo image as a pair of right and left images captured by the cameras 1a and 1b may be processed by an image processor 2. The image processor 2 may obtain an amount of shift (i.e., a parallax) of pixels at corresponding positions in the respective right and left images by means of a stereo-matching process, and convert the thus-obtained pixel shift amount into luminance data or any other data to generate a distance image. The image processor 2 may convert, based on the principle of triangulation, any point in the distance image into a point defined by coordinates in real space, where a vehicle widthwise direction, i.e., a lateral direction of the own vehicle is an X axis, a vehicle heightwise direction is a Y axis, and a vehicle lengthwise direction, i.e., a distance direction is a Z axis. The image processor 2 may further output distance data thus obtained from the converted three-dimensional coordinates to devices including the lane line recognizer 20 and the steering controller 30.

The steering controller 30 may execute the steering assistance control that may assist a driver with steering operations, based on lane line information from the lane line recognizer 20. The steering assistance control may include, without limitation, lane deviation prevention and lane keeping. Among these, the assistance control for the lane deviation prevention may involve adjustment of timing and a control amount of control intervention in accordance with a lane width, allowing for less incongruous, appropriate steering assistance.

One specific but non-limiting implementation may involve calculating lane deviation prediction time, based on a lateral position of the own vehicle, a yaw angle of the vehicle, and a vehicle speed after a lapse of predetermined time. The lane deviation prediction time may be a time period during which the own vehicle deviates from the lane, i.e., a time period during which the own vehicle reaches an intersection of an estimated navigation route of the own vehicle and a side edge of the lane. The lateral position of the own vehicle may be a position of the own vehicle in the lateral direction from a midpoint of the lane. The lane deviation prediction time thus calculated may be compared to a prescribed threshold. When the lane deviation prediction time is shorter than the threshold, determination of the lane deviation may be made. Thus, an alarm may be given by means of the alarm and the display 50, while an electric power steering may be allowed to generate steering torque to take actions such as correction steering for the lane deviation prevention.

However, the lane lines are not always provided on both right and left sides of the own vehicle. In some cases, the lane line may be provided on either one side. In such a case, execution of the steering assistance control based on the lane width may become difficult. On the other hand, with the lane line provided on either one side, there may be cases in which travelling across the lane line is unavoidable. In this situation, execution of the steering assistance control based on the lane line on either one side may cause the steering assistance control to be started unnecessarily, causing a driver to feel annoyed more frequently.

The lane line recognizer 20 may therefore include, without limitation, a lane line recognition unit 21, a lane width setting unit 22, and a lane line state transition determination unit 23. The lane line recognition unit 21 may recognize the lane lines on the road. The lane width setting unit 22 provides setting of a lane width. The lane width setting unit 22 may provide the setting of the lane width, based on the lane lines on both the right and left sides, when the lane lines are provided on both the right and left sides of the own vehicle. The lane width setting unit 22 provides the setting of the lane width, with a virtual lane line assumed on side on which the lane line is missing, when the lane line is provided on either one of the right and left sides of the own vehicle. The lane line state transition determination unit 23 monitors a lane line state that involves presence or absence of the lane lines on the right and left sides of the own vehicle. The lane line state transition determination unit 23 may determine which state the current lane line state has transited from. This allows for the steering assistance control equivalent to that in the case with the lane lines on both the right and left sides, with the lane width obtained using the virtual lane line. Hence, it is possible to perform the steering assistance, with the timing and the control amount of the control intervention adjusted appropriately, without annoying a driver.

The lane line recognition unit 21 may recognize the lane lines on the road, as the lane lines along which the own vehicle travels, based on the original images captured by the cameras 1a and 1b and the distance data outputted from the image processor 2. As used herein, the term "lane line" refers to, as a generic term, any line that extends on the road and defines a lane, regardless of whether the line is a solid line, a broken line, or any other patterned line. The term "lane line" as used herein also refers to a white line, a yellow line, or any other colored line. Further, even when the lane line present on the road is a double lane line or the like, such a double lane line or the like is approximated by and thus recognized as a single straight line or a single curve line for each of the lane lines on the right and left sides, in the recognition of the lane lines.

In one specific but non-limiting implementation, the lane line recognition unit 21 may extract, from the image, a group of dots that may serve as a proposed lane line, and may calculate a straight line or a curve line that joins the proposed lane line dots together, to recognize the lane line. Alternatively, the lane line recognition unit 21 may extract image elements that match with a characteristic of a lane line model prepared in advance, to recognize the lane line. In one implementation, the lane line recognition unit 21 may evaluate a change in luminance in a widthwise direction of the road on an image plane, to extract the group of dots that may serve as the proposed lane line, and may perform processing on time-series data on the group of dots as the proposed lane line, to recognize the lane line.

In one specific but non-limiting implementation, the lane line recognition unit 21 may detect an edge where luminance changes at a predetermined rate or higher, along a plurality of search lines set horizontally (in the vehicle widthwise direction). In this way, the lane line recognition unit 21 may detect a pair of a lane line starting point and a lane line ending point for each of the search lines, and may extract, as the proposed lane line dots, a region between the lane line starting point and the lane line ending point. Thereafter, the lane line recognition unit 21 may perform processing on time-series data on three-dimensional coordinate positions of the proposed lane line dots based on an amount of movement of the vehicle per unit time. Thus, the lane line recognition unit 21 may calculate a model that approximates the lane lines on the right and left sides, and may recognize the lane lines by means of the model. As the model that approximates the lane lines, an approximation model that couples together linear components obtained by Hough transformation, or a model approximated by a curve such as a quadratic function may be used.

The lane width setting unit 22 may calculate a distance in the X direction (i.e., in the vehicle widthwise direction of the own vehicle) between the right and left lane lines recognized by the lane line recognition unit 21, and may set the distance between the lane lines as the lane width. When the lane line is provided on either one of the right and left sides, the lane width setting unit 22 may assume the virtual lane line, in accordance with the transition of the lane line state determined by the lane line state transition determination unit 23, and may provide the setting of the lane width with use of the virtual lane line. Data on the lane width set by the lane width setting unit 22 may be sent to the steering controller 30, allowing for optimum adjustment of the timing and the control amount of the control intervention of the steering assistance, in accordance with the lane width.

Figure 2:
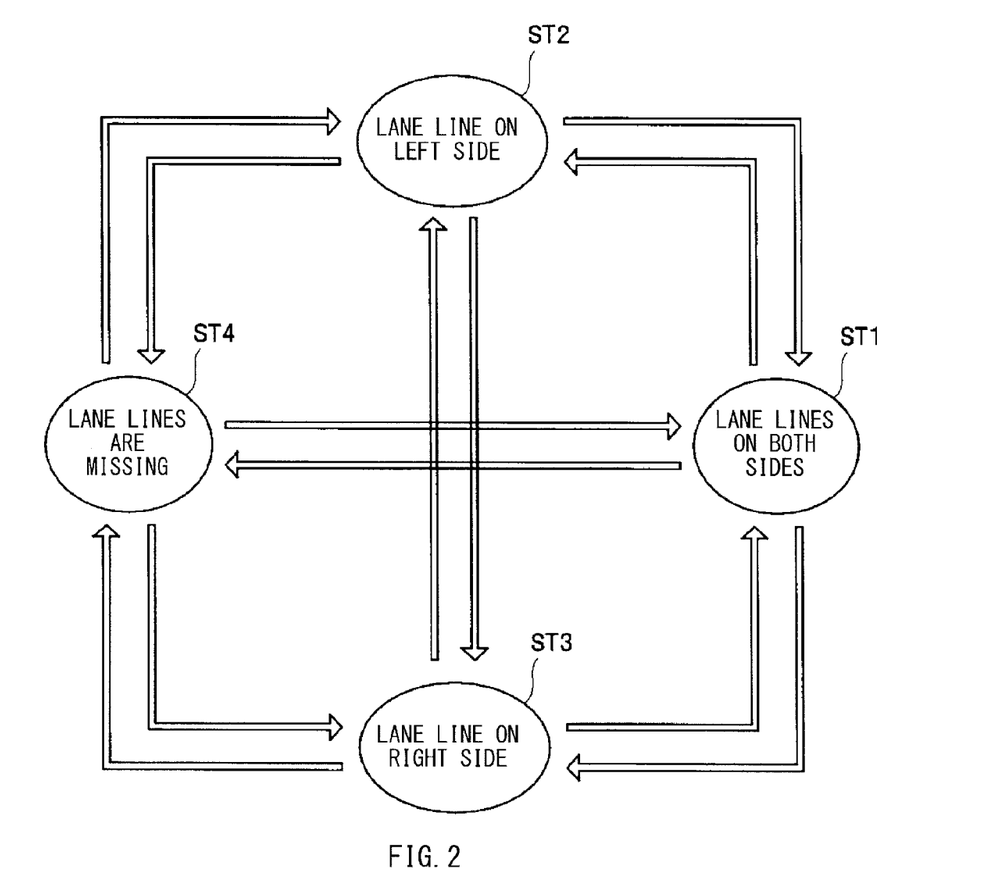
FIG. 2 illustrates an example of transition of a lane line state.

The lane line state transition determination unit 23 determines how the lane line state has transited. The transition of the lane line state may be recited as transition among the following states ST1, ST2, ST3, and ST4, as illustrated in FIG. 2. The lane line state transition determination unit 23 may monitor the transition among the states ST1 to ST4, may determine which state the current lane line state has transited from, and may send a result of the determination to the lane width setting unit 22.

ST1: a state in which the lane lines are provided on both sides of the own vehicle.

ST2: a state in which the lane line is provided on the left side of the own vehicle.

ST3: a state in which the lane line is provided on the right side of the own vehicle.

ST4: a state in which the lane lines are missing.

In a situation with the state ST1 in which the lane lines are provided on both sides, the lane width may be large in a highway, but small in a general road. When the lane width is large, a case of travelling deliberately near the lane line is considered to be rare. Hence, it is possible to improve controllability by relatively advancing the timing of the control intervention of the steering assistance, as well as relatively increasing the control amount, as compared to those in other states. Meanwhile, when the lane width is small, a case of travelling near the lane line is considered to be frequent. In this situation, an excessive increase in the control amount of the steering assistance may possibly cause deviation into an opposite lane. It is therefore appropriate to relatively retarding the timing of the control intervention of the steering assistance, as well as relatively decreasing the control amount.

A situation with the states ST2 and ST3 in which the lane line is provided on either one side may be often found in the general road. In this situation, the lane width may be possibly small, and a case of travelling daringly across the lane line may be possible. It is therefore appropriate to cope with the situation similarly to the case with the state ST1 in which the lane lines are provided on both sides and the lane width is small. In other words, it is appropriate to retard the timing of the operation intervention and to decrease the control amount.

However, temporarily, there may be a case, also in the highway, in which the lane line is provided on either one side. Coping with this case as described above may cause the variation in the control performance between the case with the lane line on either one side and the case with the lane lines on both sides, resulting in difficulty in restraining the lane deviation in the case with the lane line on either one side. However, in the highway, the case with the lane line on either one side is rare. It is therefore possible to perform an equivalent control to that of the case with the lane lines on both sides, by maintaining the lane width with the lane lines on both sides, only when one of the lane lines on both sides has become missing.

Figure 3:
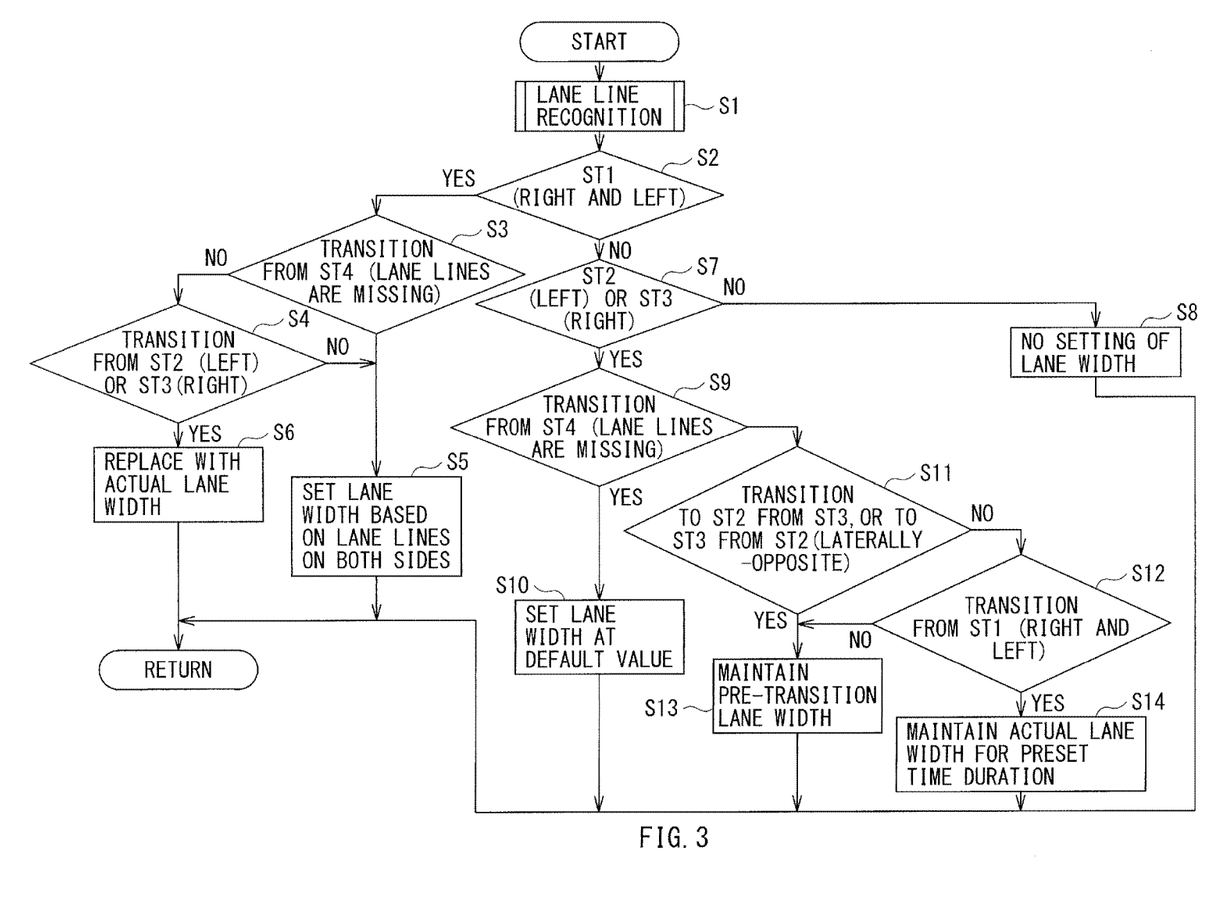
FIG. 3 is a flowchart of an example of processing of setting of a lane width.

In one specific but non-limiting implementation, the lane width may be set in accordance with the transition among the states ST1 to ST4, by programmed processing of the setting of the lane width as illustrated in a flowchart in FIG. 3. Note that, in one implementation, similar processing may be carried out regarding the transition to/from the state ST2 or ST3 in which the lane lines are provided on either one of the right and left sides, among the states ST1 to ST4.

In the processing of the setting of the lane width, first, in step S1, lane line recognition may be performed. In step S2, examination may be made as to whether or not the lane line state is the state ST1 in which the lane lines are provided on both the right and left sides. When the lane line state is the state ST1 in which the lane lines are provided on both the right and left sides, the flow may proceed to step S3. In step S3, determination may be made as to whether or not the transition has been made to the current state ST1 in which the lane lines are provided on both the right and left sides, from the previous state ST4 in which the lane lines are missing.

In step S3, when it is determined that the transition has been made to the state ST1 with the lane lines on both the right and left sides, from the state ST4 in which the lane lines are missing, the flow may proceed to step S5 from step S3. In step S5, calculation may be made as to the distance in the X direction between the lane lines on both the right and left sides. The distance thus calculated may be set as the lane width, and the processing may be finished.

Meanwhile, in step S3, when it is determined that the transition has not been made to the state ST1 from the state ST4, the flow may proceed to step S4. In step 4, determination may be made as to whether or not the transition has been made to the state ST1 from the state ST2 or ST3 in which the lane line is provided on either one of the right and left sides. In step S4, when it is determined that the transition has not been made to the state ST1 from the state ST2 or ST3, in other words, when the previous state was the state ST1, the flow may proceed to step S5. In step S5, the setting of the lane width may be provided, based on the lane lines on the right and left sides, as described.

Figure 4:
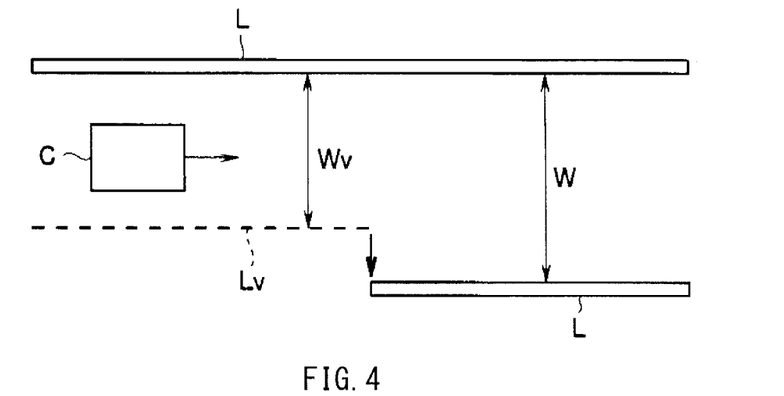
FIG. 4 illustrates an example of the setting of the lane width in a case of the transition to a state ST1 from a state ST2.

Meanwhile, in step S4, when it is determined that the transition has been made to the state ST1 from the state ST2 or ST3 with the lane line on either one side, the flow may proceed to step S6 from step S4. In step S6, the lane width may be changed, from the lane width with the lane line provided on either one side, to the lane width with the actual lane lines provided on both the right and left sides. For instance, referring to FIG. 4, in the state ST2 in which the actual lane line L is provided on the left side in a travelling direction of the own vehicle C, the setting of the lane width Wv may be provided, with the virtual lane line Lv assumed on the right side. When the transition has been made from the state ST2 to the state ST1 with the lane lines provided on both sides, the lane width Wv may be replaced with an actual lane width W. Note that the setting of the lane width Wv with the lane line on either one side may be provided as a prescribed default value, as described later.

Thereafter, in step S2, when the lane line state is not the state ST1 in which the lane lines are provided on both the right and left sides, the flow may proceed to step S7 from step S2. In step S7, determination may be made as to whether or not the lane line state is the state ST2 or ST3 in which the lane line is provided on either one of the right and left sides. When the lane line state is neither the state ST2 nor the state ST3, the flow may proceed to step S8 from step S7. In step S8, with the absence of the lane lines assumed, the processing may be finished without setting the lane width.

Figure 5:
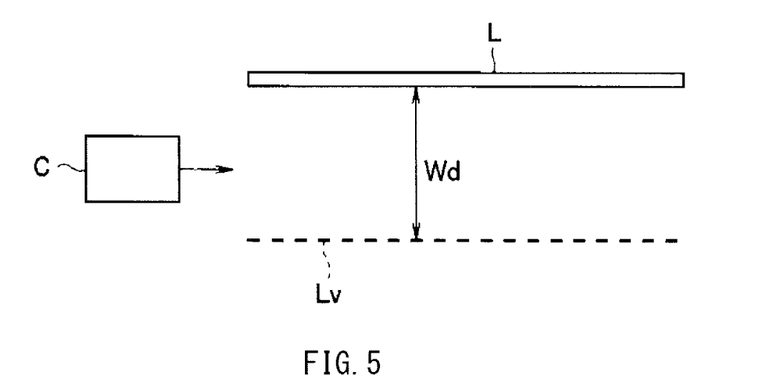
FIG. 5 illustrates an example of the setting of the lane width in a case of the transition to the state ST2 from a state ST4.

In step S7, when the lane line state is the state ST2 or ST3 in which the lane line is provided on either one of the right and left sides, the flow may proceed to step S9 from step S7. In step S9, determination may be made as to whether or not the transition has been made to the state ST2 or ST3 from the state ST4 in which the lane lines are missing. When the transition has been made to the state ST2 or ST3 in which the lane line is provided on either one side, from the state ST4 in which the lane lines are missing, the flow may proceed to step S10 from step S9. In step S10, referring to FIG. 5, the lane width may be set as a default value Wd (e.g. 2.8 m) to ensure safety. The default value Wd may be set in advance on an assumption of a narrow road. FIG. 5 illustrates a situation in which the transition has been made to the state ST2 in which the lane line L is provided on the left side, from the state ST4 in which the lane lines on both sides of the own vehicle C are missing. In the situation illustrated in FIG. 5, a position of the virtual lane line Lv on the right side may be fixed with the lane width Wd with respect to the lane line L on the left side.

Figure 6:
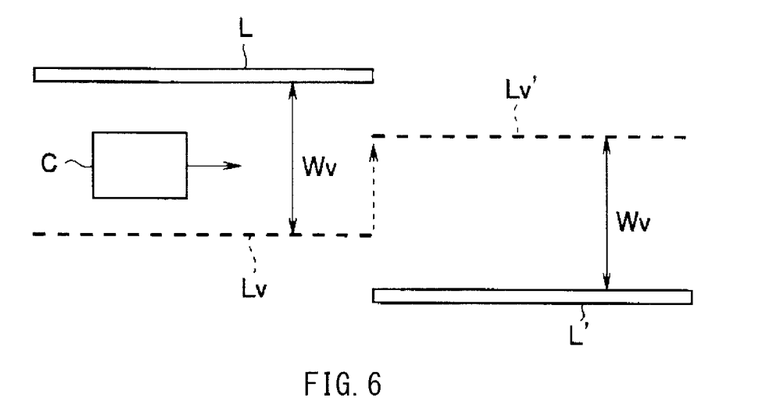
FIG. 6 illustrates an example of the setting of the lane width in a case of the transition to a state ST3 from the state ST2.

Meanwhile, in step S9, when it is determined that the transition has not been made to the state ST2 or ST3 from the state ST4, the flow may proceed to step S11 from step S9. In step S11, determination may be made as to whether or not the transition has been made to the state ST2 in which the lane line is provided on the left side, from the state ST3 in which the lane line is provided on the right side, i.e., on laterally-opposite side, or to the state ST3 from the state ST2. When the transition has been made to the state ST2 from the state ST3, or to the state ST3 from the state ST2, the flow may proceed to step S13 from step S11. In step S13, the pre-transition lane width Wv may be maintained. In one specific but non-limiting implementation, referring to FIG. 6, the transition may be made to the state ST3 with the lane line L' on the right side, from the state ST2 with the lane line L on the left side in the travelling direction of the own vehicle C. In this case, the virtual lane line may be shifted from the lane line Lv on the right side to a lane line Lv' on the left side. However, the lane width Wv may be maintained at a pre-transition value. Hence, it is possible to ensure smooth controllability while restraining variation in the steering control amount.

Meanwhile, in step S11, when it is determined that the transition has not been made to the state ST2 in which the lane line is provided on the left side, from the state ST3 in which the lane line is provided on the right side, i.e., on the laterally-opposite side, or to the state ST3 from the state ST2, the flow may proceed to step S12. In step S12, determination may be made as to whether or not the transition has been made from the state ST1 with the lane lines on both the right and left sides. In step S12, when the transition has not been made from the state ST1, in other words, when the state ST2 or ST3 is maintained in which the lane line is provided on one identical side throughout the transition, the flow may proceed to step S13. In step S13, the processing of maintaining the lane width as described above may be carried out.

Figure 7:
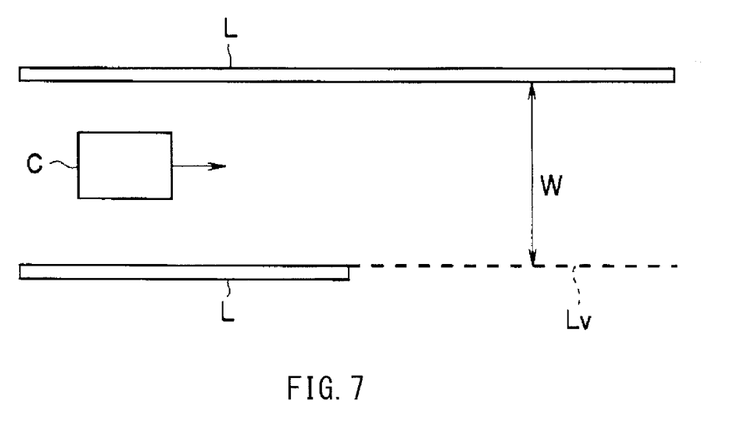
FIG. 7 illustrates an example of the setting of the lane width in a case of the transition to the state ST2 from the state ST1.

Meanwhile, in step S12, when it is determined that the transition has been made to the state ST2 or ST3 with the lane line on either one side, from the state ST1 with the lane lines on both sides, the flow may proceed to step S14 from step S12. In step S14, the actual lane width W as in the state ST1 may be maintained for preset time duration. In one specific but non-limiting implementation, referring to FIG. 7, the transition may be made to the state ST2 with the lane line L on the left side, from the state ST1 with the lane lines L on both the right and left sides in the travelling direction of the own vehicle C. In this case, the actual, pre-transition lane width W may be maintained for the preset time duration, making it possible to restrain unnecessary control intervention while keeping a driver from feeling incongruous or annoyed.

As described, the implementation may involve monitoring the lane line state regarding the presence or absence of the lane lines on both the right and left sides of the own vehicle. When it is determined that the lane line state has transited to the state in which the lane line is provided on either one of the right and left sides of the own vehicle, the setting of the lane width may be provided, with the virtual lane line assumed on side on which the lane line is missing. Hence, it is possible to assist a driver with steering operations, based on the lane width, while restraining the unnecessary control intervention and keeping the driver from feeling incongruous or annoyed. It is also possible to restrain the variation in the control performance between a case of the highway with the lane lines on the right and left sides, and a case of a relatively narrow road with the lane line on either one side.

Although some preferred implementations of the technology have been described in the foregoing by way of example with reference to the accompanying drawings, the technology is by no means limited to the implementations described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A steering assistant that determines intervention timing and a control amount of an assistance control that involves assisting a driver with steering operations, based on a lane width of a road on which an own vehicle travels, the steering assistant comprising:
   a lane width setting unit that provides setting of a lane width between lane lines on right and left sides of the own vehicle when the lane lines on right and left sides of the own vehicle are visible; and
   a determination unit that monitors the road to determine a lane line state including a first state in which the left lane line is visible but the right lane line is not visible, and a second state in which the right lane line is visible but the left lane line is not visible, wherein
   the lane width setting unit that sets the lane width set when the lane lines on right and left sides of the own vehicle are visible to a lane width between the left lane line and a virtual right lane line when the lane line state is in the first state, and to a lane width between a virtual left lane line and the right lane line when the lane line state is in the second state, and
   when the determination unit determines that the lane line state changes from the first state to the second state, the lane width setting unit maintains the previously set lane width in the first state, and when the determination unit determines that the lane line state changes from the second state to the first state, the lane width setting unit maintains the previously set lane width in the second state.

2. The steering assistant according to claim 1, wherein the lane line state includes a third state in which the left and right lines are not visible, and
when the determination unit determines that the lane line state changes from the third state to the first state or to the second state, the lane width setting unit sets a default value to the lane width.

3. The steering assistant according to claim 2, wherein the lane line state includes a fourth state in which the left and right lines are visible, and when the determination unit determines that the lane line state changes from the fourth state to the first state or to the second state, the lane width setting unit maintains the lane width used in the fourth state for a preset time duration.

4. The steering assistant according to claim 1, wherein the lane line state includes a fourth state in which the left and right lines are visible, and
when the determination unit determines that the lane line state changes from the fourth state to the first state or to the second state, the lane width setting unit maintains the lane width used in the fourth state for a preset time duration.

5. A steering assistant that determines intervention timing and a control amount of an assistance control that involves assisting a driver with steering operations, based on a lane width of a road on which an own vehicle travels, the steering assistant comprising
circuitry configured to:
provide setting of a lane width between lane lines on right and left sides of the own vehicle when the lane lines on right and left sides of the own vehicle are visible; and
monitor the road to determine a lane line state including a first state in which the left lane is visible but the right lane is not visible, and a second state in which the right lane is visible but the left lane is not visible; and
set the lane width set when the lane lines on right and left sides of the own vehicle are visible to a lane width between the left lane line and a virtual right lane line when the lane line state is in the first state, and to a lane width between a virtual left lane line and the right lane line when the lane line state is in the second state, wherein
when the circuitry determines that the lane line state changes from the first state to the second state, the circuitry maintains the previously set lane width in the first state, and when the circuitry determines that the lane line state changes from the second state to the first state, the circuitry maintains the previously set lane width in the second state.

6. The steering assistant according to claim 5, wherein the lane line state includes a third state in which the left and right lines are not visible, and
when the circuitry determines that the lane line state changes from the third state to the first state or to the second state, the circuitry sets a default value to the lane width.

7. The steering assistant according to claim 6, wherein the lane line state includes a fourth state in which the left and right lines are visible, and
when the circuitry determines that the lane line state changes from the fourth state to the first state or to the second state, the circuitry maintains the lane width used in the fourth state for a preset time duration.

8. The steering assistant according to claim 5, wherein the lane line state includes a fourth state in which the left and right lines are visible, and
when the circuitry determines that the lane line state changes from the fourth state to the first state or to the second state, the circuitry maintains the lane width used in the fourth state for a preset time duration.

* * * * *